United States Patent [19]

Gordon

[11] 3,962,166

[45] June 8, 1976

[54] STABLE UREA-FORMALDEHYDE COMPOSITIONS

[75] Inventor: Alex F. Gordon, Black Mountain, N.C.

[73] Assignee: United Merchants and Manufacturers, Inc., New York, N.Y.

[22] Filed: Nov. 22, 1974

[21] Appl. No.: 526,083

Related U.S. Application Data

[63] Continuation of Ser. No. 259,770, June 5, 1972, abandoned.

[52] U.S. Cl. .......................... 260/29.4 R; 260/69 R
[51] Int. Cl.² ........................................ C08L 61/20
[58] Field of Search ...................... 260/29.4 R, 69 R

[56] References Cited
UNITED STATES PATENTS

| | | | |
|---|---|---|---|
| 2,200,931 | 5/1940 | Moore | 260/69 R |
| 2,625,524 | 1/1953 | Kvalnes | 260/69 R |
| 2,669,551 | 2/1954 | Vaughan | 260/29.4 R |
| 3,183,200 | 5/1965 | Hewson | 260/69 R |
| 3,247,149 | 4/1966 | Alex | 260/29.4 R |
| 3,539,484 | 11/1970 | Bowman et al. | 260/29.4 R |

*Primary Examiner*—Lorenzo B. Hayes
*Attorney, Agent, or Firm*—Michael A. Caputo; John P. McGann

[57] ABSTRACT

A stable, high concentration urea-formaldehyde composition having a urea to formaldehyde ratio from about 1:1.5 to 1:2.8, a free formaldehyde content of less than 3% and an active ingredient concentration of greater than 60%. Additionally, a method for making the composition comprising adjusting the pH of a mixture of urea and formaldehyde having a urea/formaldehyde ratio greater than about 1:4 to a value greater than about 10, reacting the mixture of the temperature from about 100° to 230°F and adjusting the urea/formaldehyde ratio during the reaction time to the desired final value. The composition is useful for imparting crease and wrinkle resistance to textile fabrics, coating of paper, and bonding of wood.

5 Claims, No Drawings

STABLE UREA-FORMALDEHYDE COMPOSITIONS

CROSS REFERENCE TO RELATED APPLICATIONS

This application is a continuation of copending application Ser. No. 259,770, filed on June 5, 1972, now abandoned.

BACKGROUND OF THE INVENTION

1. Field of the Invention

This invention relates to the field of aminoplast resins. More particularly, this invention concerns a new highly stable urea-formaldehyde type composition for the treatment of cellulose-containing materials.

2. Description of the Prior Art

The manufacture of urea-formaldehyde condensates in general is an old and well established art as is their use for various purposes including textile finishing. Thus, for example, dimethylol urea is a well known textile finishing agent for imparting durable wrinkle recovery and shrinkage control to textile materials containing or being derived from cellulose. Additionally, other types of amino-plast resins such as methylolated carbamates are well known as creaseproofing chemicals (see U.S. Pat. No. 3,524,876 and U.S. Pat. No. 3,369,858).

One of the major problems encountered with urea-formaldehyde precondensates of the water soluble type has been the lack of stability of such condensates particularly in highly concentrated form. Consequently, in marketing such condensates, it has been necessary to ship from the original place of preparation a relatively dilute solution, generally in concentrations in the range from 10 to 15%. Thus, the cost of transportation per unit of active material is relatively high inasmuch because of the high water content. At the point of use, if a more concentrated solution is desired, this water must then be removed which adds to the total process cost.

Additionally, an inherent problem in the materials known heretofore has been the presence of a relatively high urea to formaldehyde ratio. This cause disadvantages in that at high ratios, free formaldehyde is released into the atmosphere which, besides being disagreeable, constitutes a health hazard.

SUMMARY OF THE INVENTION

I have discovered a new urea-formaldehyde precondensate which in addition to possessing extremely high stability for long periods of time at high concentrations, also possesses a relatively low urea to formaldehyde ratio and a low free formaldehyde content. More particularly, I have discovered a highly stable mixture of methylol-urea and water which has a urea to formaldehyde ratio in the range from about 1:1.4 to 1:2.8, a free formaldehyde content of less than about 3% and a concentration of methylol urea in excess of about 60% based on the weight of the mixture.

I have further discovered that the above composition may be prepared by adjusting the pH of an aqueous mixture of urea and formaldehyde which has a urea to formaldehyde ratio greater than about 1:4 and a solids content in the range from 15 to 50% to a value greater than about 10; heating the mixture at a temperature in the range from about 100° to 230°F for about 1 to 3 hours; adjusting the ratio of urea to formaldehyde to a value in the range from about 1:1.4 to 1:2.8 during the heating step and then cooling the mixture to room temperature and adjusting the pH of the cool mixture to a value in the range from about 7.5 to 8.0.

The precondensate composition of the present invention is suitable for use as a finish in the textile industry in order to impart wrinkle resistance to fabrics, and as adhesives, lacquers, finishes, wood impregnating agents, and binders for molded products and other cellulosic materials in the furniture industry and in coatings in the paper industry.

DESCRIPTION OF THE PREFERRED EMBODIMENT

The composition of the present invention comprises a stable mixture of urea and formaldehyde, commonly referred to as methylol-urea, and water. Particularly, the present invention comprises a stable urea-formaldehyde composition having a urea-formaldehyde content of less than about 3% and a solids or active ingredient concentration of greater than about 60% based on the weight of the mixture, the remaining portion of the mixture being water. Additionally, the compositions of the present invention have a storage stability at room temperature of greater than 3 months. Preferably, the concentration of the active ingredients is greater than about 80% by-weight based on the weight of the total mixture.

The composition of the present invention is formulated by preparing a mixture of formaldehyde, urea and water, the concentration of the formaldehyde in the mixture being in the range from about 10% to 35% and the urea to formaldehyde ratio of the mixture being greater than about 1:4 and preferably from about 1:4.5 to 1:5. In place of formaldehyde, other materials, e.g., paraformaldehyde, trioxane, acroleine, methacrolein, glyoxal or glutaraldehyde may be used. In place of urea, dicyandiamide, guanidine, ethylene or urea, propylene urea may be used. The formaldehyde is generally used in a commercially available concentration, i.e., 30–44%, although other concentrations may be used.

Thereafter, the pH of the mixture is adjusted to a greater value than about 10 and preferably in the range from about 10.5 to 13. The pH adjustment may be carried out by using a suitable alkaline agent, e.g., sodium hydroxide, potassium hydroxide, calcium hydroxide, lithium hydroxide, etc.

Thereafter, the mixture is heated at a temperature in the range from about 100° to 230°F for about 1 to 3 hours and preferably between about 180°–200°F for one hour.

During the heating step, the ratio of urea to formaldehyde is adjusted to a range from about 1:1.4 to 1:2.8 by adding urea to the mixture. The value to which the ratio is adjusted may be the final desired value or may be greater than the final value in which case additional urea may be added as hereinafter described.

Thereafter, the mixture is allowed to cool to room temperature and the pH is adjusted to a value in the range from about 7.5 to 8.0, preferably from about 7.5 to 7.6.

The final concentration of methylol-urea in the solution thus prepared is generally in the range from about 58 to 75% and preferably in the range from about 60 to 70%.

If desired, during the reaction time the urea to formaldehyde ratio may be adjusted by the use of several separate additions of urea, in order to bring the final ratio up to the final desired value. Additionally, if desired, the final pH adjustment may be carried out just prior to the final addition of urea. Usually, however, this type of pH adjustment is used when most of the urea has already been added to the mixture.

As noted hereinabove, the compositions obtained by the present process are unusual in that not only do they have a relatively high concentration of active ingredient, i.e., methylol-urea, but also they are remarkably stable at room temperature for long periods of time.

The stability of the present composition may be further increased by adding compounds to the mixture which serve to promote cyclic ring formation. Thus, for example, various hydroxyl reactants including lower alkyl alcohols, such as, methanol, ethanol, propanol, butanol, etc. amines, such as, methylamine, ethylamine, propylamine, ethylene-diamine, allylamine, or aniline; hydroxylamines, such as, monoethanolamine, di or triethanol amine; aldehydes such as trioxane, aceteldehyde, chloral, glyoxal, proprionaldehyde, butyraldehyde, valeraldehyde, caproaldehyde, acrolein, furfural, cretonaldehyde, and benzaldehyde; ketones such as acetone, methyethyl ketone, propylketone, and the like, may be used.

Thus, for example, when amines are used, the stability is increased by forming the six membered triazone ring. When dialdehydes are used, the imidazolidinone ring is formed.

Generally, these stabilizers are added in amounts up to about 1 mole for each 10 moles of the original condensate.

Usually, these stabilizers are added after the heating step when the urea to formaldehyde ratio is being adjusted to the 1:1.4 to 1:2.8 range.

The composition of the present invention are useful in imparting wrinkle recovery and shrinkage control to cellulosic or cellulose-containing fabrics and, as such, may be applied to such materials by any of the convention procedures known in the textile industry. Thus, they may be applied by padding, dipping, spraying, immersing and the like. Regardless of the method of application, amounts of between about 2 and 20%, and preferably between about 4 and 12% of resin solids are applied to the particular fabric material based on its dry weight.

After application of the methylolated urea-formaldehyde composition, the treated fabric is dried and cured to impart wrinkle resistance and shrinkage control thereto. Normally, curing is effected by means of a curing catalyst or accelerator which may be a free acid, acid salt, alkanolamine salt, metal salt and the like. The concentration of catalysts employed may range from about 0.1 to about 35% or higher based upon the weight of resin solids. Suitable catalysts for use in the above process include zinc nitrate, free acids, such as, phosphoric acid, lactic acid, tartaric acid, oxalic acid, acid salts, such as, ammonium chloride; amine salts, such as alkanolamine salts, for example, diethanolamine hydrochloride, metal salts, such as, magnesium chloride, zinc chloride, aluminum chloride, and the like.

Following the application of the reactants and curing accelerator to the cellulosic textile material, the material is normally subjected to drying and curing operation may be carried out in a single step, if desired, or in separate steps. The temperature at which the drying and curing operations are effected can vary widely and are influenced to some extent by the type of catalysts employed, but are generally conventional.

Normally the range of temperature extends from about 180°F to about 450°F or higher. Generally, the drying and/or curing time is inversely proportional to the temperature employed and additionally may be influenced by the use of separate or combined drying and curing steps.

Conventionally, when the drying and curing steps are carried out as a combined operation, the period is from about 1 minute to about 10 minutes at temperatures from about 450° to 250°F, respectively. When the fabric has been dried preliminary to curing, the curing time is in the order of 5 minutes to about ¼ minute at a temperature from between about 250° and 450°F, respectively.

As used herein, the term "cellulose containing textile material" means fibers, yarns, filaments, formed fabrics, whether knitted, woven, non-woven, felted or otherwise formed, which contain at least about 50% of cellulosic fibers. Typical of such materials are cotton, viscose rayon, linen, flax, jute, ramie, and the like. These cellulosic textile materials may be employed in combinations with other known textile materials. Thus, they may be blended with other natural synthetic fibers as, for example, silk, wool, the acrylic and polyester fibers, the nylons, and the like.

Additionally, the methylol urea condensate of the present invention may be used for the impregnation of other cellulosic products, e.g., paper and wood, using the conventional techniques of those arts. Thus, for example, the use of aminoplasts and melamine resins in connection with casein, gelatin or other protein containing coatings in the paper industry is well known. (See "Paper Making and Paper Board Making" Tappi Publications, Sales Department, Technical Editor, John Franklin, 1 Dundoody Park, Atlanta, Georgia). Usually, in such protein-clay coatings, only certain types of relatively expensive methylolated melamine formaldehyde resins may be used. Thus, urea-formaldehyde resins have not been used in such coating because the relatively loosely bound formaldehyde present in this type resin causes coagulation or jellying of the coating mix. The composition of the present invention, however, when used in place of the methylolated melamine formaldehyde resins, does not cause coagulation. Consequently, the present composition provides a low-cost resin which substantially improves the coating stability of the coating mixture as well as improving the crocking characteristics of pigments incorporated in the paper, and extending the stability of the viscosity of the protein coating mix during long periods of application which results in increased uniformity of the paper products.

Additionally, the present composition may be used in the bonding of wood, for example, as described in U.S. Pat. No. 3,100,754, incorporated herein by reference.

The composition of the present invention may also be used to increase the strength of paper when used in the manner described in Die Herstellung na fester Papiere durch Zusatz von Kunstharzen zur Papiermasse, Angewandte Chemie 62, 405 (1950), and German Patent No. 1,213,226.

The following examples illustrate the present invention:

In the examples the various analyses were carried out as follows:

1. Specific gravity at 60°F (Hydrometer)

2. Free formaldehyde ($NaHSO_3$ Titrotion in the presence of ice)

3. Active material - 5 grams of the resin precondensate with 1% by-weight ammonium chloride in a standard weighing bottle was heated at 102°C until constant weight was reached. The percentage loss in weight corresponds to the percent by-weight of the active material.

4. Stability (Visually observed as shelf-life)

EXAMPLE 1

A mixture of two moles of urea and four moles of 40% solution of formaldehyde was prepared. The pH of the mixture was adjusted with sodium bicarbonate to 8.5. Thereafter, the mixture was allowed to stand for 10 minutes and then the pH was adjusted to a value between 8.8 and 9 with 50% sodium hydroxide. Thereafter, 9 moles of paraformaldehyde were added and the temperature of the mix was slowly raised with stirring to 165°–175°, until the solution became clear. The mix was then permitted to cool to room temperature at a rate less than 3°F per minute. This mixture is designated mixture A.

The pH at 1000 grams of mixture A was adjusted to 10.5 with sodium hydroxide. Fifty grams of urea were added and the temperature of the mixture was raised to 180° and then cooled to room temperature at a rate less than 3°F per minute. The pH was then adjusted to 7.6–8.0 with hydrochloric acid, as needed. This mixture is designated mixture B.

A paste of 290 grams of urea and 75 grams of water was prepared. One thousand grams of mixture B was added to the paste and the whole was stirred until it completely dissolved at room temperature. This final product had the following properties:

1. Specific gravity at 60°F - 1.285
2. pH 7.2 - color white
3. Free formaldehyde 1–2%
4. Active material 74–85%
5. Urea-formaldehyde ratio 1:1.9

This composition was stable in storage for over 3 months and maintained its water solubility for 4 months.

EXAMPLE 2

A solution of 2 moles of urea and 4 moles of 40% formaldehyde was prepared. The pH of this solution was adjusted to 8.5 with sodium bicarbonate and the mixture was allowed to stand for 10 minutes. Thereafter, the pH of the mixture was adjusted to a value between 8.8 to 9.0 with 50% sodium hydroxide. Nine moles of paraformaldehyde were then added and the temperature of the mixture was slowly raised to 165°–175°F and stirred until a clear solution was obtained. The mixture was then permitted to cool slowly to room temperature.

The pH of the resulting mixture was adjusted to 10.5 with sodium hydroxide and then 50 grams of urea were added. The temperature of this mixture was then raised to 150°F and then the mixture was cooled as before. The pH was then adjusted to a value in the range from 7.6–8.0 with hydrochloric acid. This mixture was designated mixture C.

A paste of 290 grams of urea and 75 grams of 98% methanol was prepared. One thousand grams of the mixture C was added to this paste with stirring until the urea-formaldehyde mixture completely dissolved. This composition has the following properties:

1. Specific gravity at 60°F 1.280
2. pH 7.2 color white
3. Free formaldehyde 0.6%
4. Active material 84%
5. Urea-formaldehyde ratio 1:1.9

The composition maintained its water solubility for over 3 months.

EXAMPLE 3

A commercial product UF-85 (Allied Chemical Corporation) which is an 85 percent concentration urea-formaldehyde condensate (1020 grams of the product as obtained contain 4 moles of urea, 20 moles of formaldehyde and 10 moles of water) was used as a starting material in this example. (1020 grams of UF-85 as mixed with 1 mole of urea and the pH was then adjusted with sodium hydroxide to a value between 10.5 and 11. The mixture was then refluxed for 1 hour and allowed to cool. The pH was adjusted to 7.6 with hydrochloric acid dissolved in methanol.

The mixture was then allowed to stand for 5-10 minutes to allow for completion of the reaction at room temperature and then an additional 5 moles of urea, slurried in 1 mole of methanol, was added.

The final product thus obtained had the following composition: 10 moles urea, 20 moles formaldehyde, 10 moles water, 1 mole methanol.

The product had the following characteristics:

1. Specific gravity at 60°F - 1.295
2. pH 7.4 - color white
3. Free formaldehyde 1.4%
4. Active material 85% - This composition was stable for at least three months.
5. Urea/formaldehyde ratio 1.2

EXAMPLE 4

250 grams of urea were added to 5000 grams of UF-85. The pH of the mixture was adjusted to 11 and the mixture was heated at 200°F for 1 hour. An additional 500 grams of urea were added at 150°F and 750 grams of urea were added at 130°F. Thereafter, the temperature was adjusted to 140°F and 450 grams of monoethanolamine were added. After the addition the pH of the mixture decreased to 8.5. The mixture was heated at this temperature for 2 hours and thereafter allowed to cool. Thereafter, the pH was adjusted to a value less than 8.0.

Variations can, of course, be made without departing from the spirit and scope of the invention.

Having thus described my invention what I desire to secure and claim by Letters Patent is:

1. A method for making a stable mixture of a methylol urea and water, said methylolurea having a urea to formaldehyde ratio in the range from about 1:1.4 to 1:2.8, a free formaldehyde content of less than about 3% and a concentration of methylol urea in excess of about 60% based on the weight of the mixture consisting essentially of the following steps:

A. adjusting the pH of an aqueous mixture of urea and formaldehyde which has a urea to formaldehyde ratio greater than about 1:5 and a solids content in the range from about 20 to 60% to a value greater than about 10;

B. heating the mixture at a temperature in the range from about 100° to 230°F for about 1 to 3 hours;

C. adjusting the ratio of urea to formaldehyde by adding urea to a value in the range from about 1:1.4 to 1:2.8 during heating step (B); and D. cooling the mixture to room temperature and adjusting the pH of the cool mixture to a value in the range from about 7.5 to 8.0.

2. The method of claim 1 wherein in step (C) the value of the ratio is not the final desired value and wherein subsequent to step (D) a final adjustment of the ratio to the desired value is made.

3. The method of claim 1 wherein the urea addition is carried out in at least two separate steps.

4. A method for making a stable mixture of a methylol urea and water, said methylol urea having a urea to formaldehyde ratio in the range from about 1:1.4 to 1:2.8, a free formaldehyde content of less than about 3% and a concentration of methylol urea in excess of about 60% based on the weight of the mixture consisting essentially of the following steps:

a. adjusting the pH of an aqueous mixture of urea and formaldehyde which has a urea to formaldehyde ratio greater than about 1:5 and a solids content in the range from about 20 to 60% to a value greater than about 10;

b. heating the mixture at a temperature in the range from about 100° to 230°F for about 1 to 3 hours;

c. adjusting the ratio of urea to formaldehyde by adding urea to a value in the range from about 1:1.4 to 1:2.8 during heating step (b);

d. adding a stabilizer to the reaction mixture selected from the group consisting of methanol, ethanol, propanol, butanol, methylamine, ethylamine, propylamine, ethylene-diamine, allylamine, aniline, hydroxylamine, monoethanolamine, di or triethanol amine, trioxane, acetaldehyde, chloral, glyoxal, proprionaldehyde, butyraldehyde, valeraldehyde, caproaldehyde, acrolein, furfural, cretonaldehyde, benzaldehyde, acetone, methylethyl ketone, and propylketone; and e. cooling the mixture to room temperature and adjusting the pH of the cool mixture to a value in the range from about 7.5 to 8.0.

5. A stable urea formaldehyde composition obtained by the process of claim 1.

* * * * *